United States Patent [19]

Berner et al.

[11] Patent Number: 4,786,899

[45] Date of Patent: Nov. 22, 1988

[54] CIRCUIT ARRANGEMENT FOR PCM TELECOMMUNICATION FACILITIES

[75] Inventors: Wolfgang Berner; Rolf Grabenhorst; Peter Kueffer, all of Munich; Josef Birlmeier, Deisenhofen; Gerhard Prey, Eichenau, all of Fed. Rep. of Germany

[73] Assignee: Siemens Aktiengesellschaft, Berlin and Munich, Fed. Rep. of Germany

[21] Appl. No.: 16,159

[22] Filed: Feb. 18, 1987

[30] Foreign Application Priority Data

Feb. 24, 1986 [DE] Fed. Rep. of Germany ....... 3605886
Oct. 28, 1986 [DE] Fed. Rep. of Germany ....... 3636698

[51] Int. Cl.$^4$ .......................... H04Q 9/00; H04J 3/14
[52] U.S. Cl. ............................... 340/825.500; 370/13; 370/56
[58] Field of Search ........... 340/825.5, 825.03, 825.04; 370/13-15, 85, 56, 112

[56] References Cited

U.S. PATENT DOCUMENTS

| | | | |
|---|---|---|---|
| 4,463,351 | 7/1984 | Chiarottino | 340/825.5 |
| 4,570,162 | 2/1986 | Boulton et al. | 340/825.5 |
| 4,608,700 | 8/1986 | Kirtley, Jr. et al. | 370/85 |
| 4,626,843 | 12/1986 | Szeto et al. | 340/825.5 |

OTHER PUBLICATIONS

Integrated Services Digital Network (ISDN), Oct. 1984, pp. 141 to 172, by International Telecommunication Union.

Das TTL-Kochbuch, 1/30/86, 6 pages, Texas Instruments.

"Digital Concentrators in the EWSD Telephone Switching System", by Frieser et al., Telecom Report 5 (1982), pp. 262 to 266.

Primary Examiner—Donald J. Yusko
Attorney, Agent, or Firm—Jeffrey P. Morris

[57] ABSTRACT

In a circuit arrangement for PCM telecommunication facilities, especially PCM long distance exchange facilities with several synchronous pulse clock controlled transmitters for common transmitting chanel, information from different transmission processes flows over a transmitting channel common to all transmitters. In addition to the transmitting channel, a test channel is provided. For the prevention of simultaneous transmission and a co-mingling together of information, each transmitter transmits its own binary coded address to the transmitting channel always before a message as well as to the test channel and receives back the total information after combining on the test channel for comparison, bit-by-bit with the actual address information transmitted by it. In the event of accidental simultaneous transmission start by a transmitter, in case of character inequality on the test channel between two simultaneously transmitted bits, the binary character of the one type always asserts itself against the binary character of the other type. A transmitter interrupts its transmission in the event of character inequality. The assertion principle is limited to test channels while the transmission of both types of binary characters to the transmitting channel is relatively low ohmicly.

5 Claims, 1 Drawing Sheet

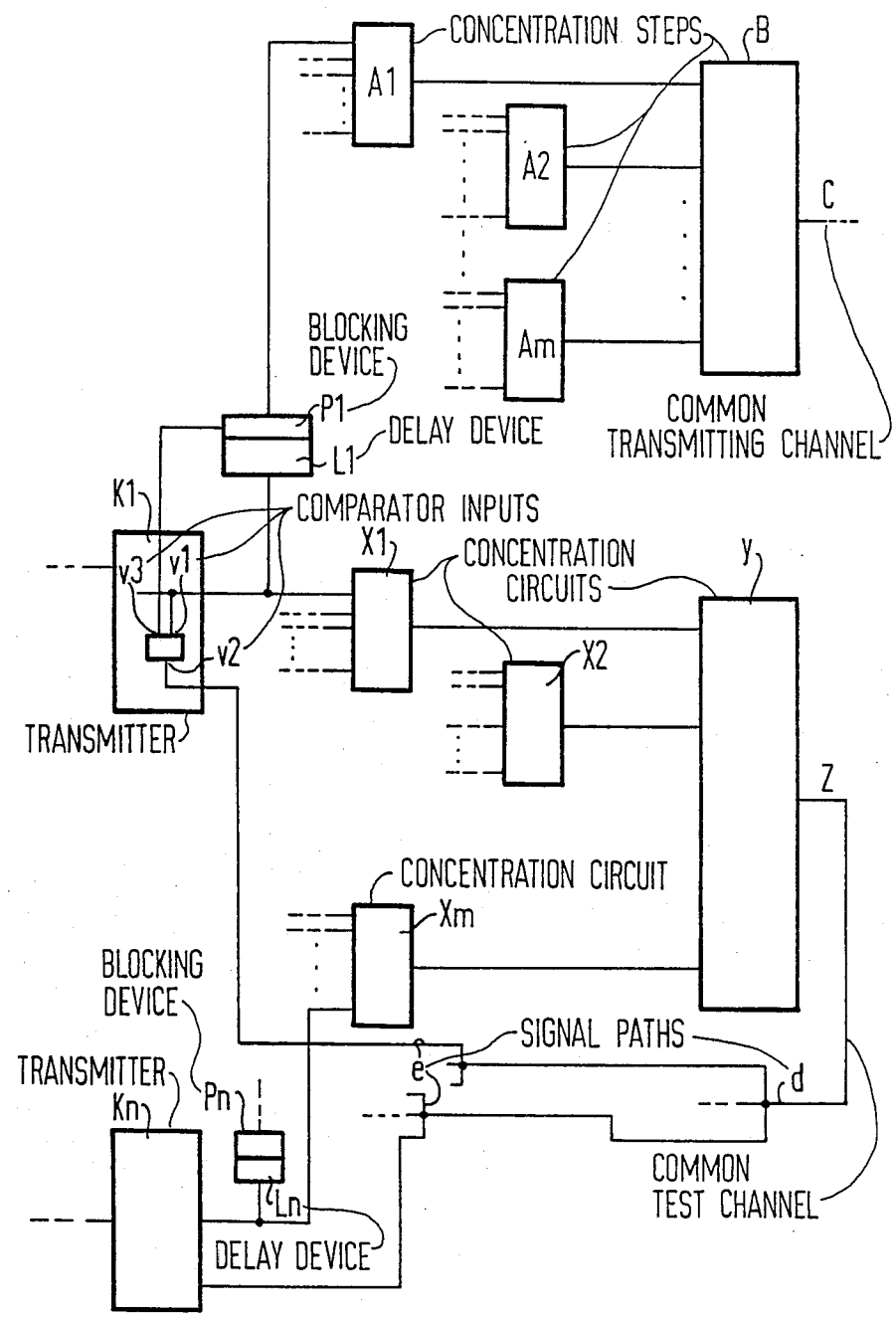

CIRCUIT ARRANGEMENT FOR PCM TELECOMMUNICATION FACILITIES

BACKGROUND OF THE INVENTION

1. Field of the Invention

The present invention relates to PCM telecommunication facilities, especially PCM long distance exchange facilities with several synchronous pulse clock controlled transmitters having a common transmitter channel.

2. Description of the Prior Art

In telecommunication facilities the problem frequently presents itself that of several peripheral devices which share a common central device to be used together, at any given time no more than one such peripheral device can be in the position to establish connection with the central device. In the known prior art, a variety of selection circuits are known in the form of selectors, relays, chain circuits and other similar electronic switching techniques. In this connection the self-blocking test multiplex is known.

The present invention relates specifically to a circuit for PCM telecommunication facilities, especially PCM long distance exchange facilities in which several synchronous pulse clock controlled transmitters for the transmission of binary coded information have simultaneous access to a common transmission channel and in which two or more simultaneous transmission processes are eliminated after simultaneous starts of two of a plurality of different transmitters. The following conditions are present:

(a) each one transmitter initially always at the beginning of a transmission process transmits its own binary coded transmitter specific address;

(b) the information transmitted by the transmitters flows together bitwise as far as they are transmitted by two or more transmitters simultaneously;

(c) with inequality of binary characters transmitted in their coequal time-slot by two or more transmitters and flowing together always the character of the one kind of the two possible kinds of binary characters maintains itself compared to the character of the other kind;

(d) the information flowing together is fed back to the transmitters;

(e) each transmitter compares the information transmitted instantaneously with the instantaneously received information bit by bit; and (f) for each transmitter the instantaneously received character is the one kind, however, the one transmitted by its time-slot coequal which is of the other kind, interrupts its transmission.

A circuit arrangement of this kind for addressing the above conditions is already known through the recommendations in the Redbook of the CCITT. In circuits of this nature, for each transmitter the possibility of access to a common transmission channel is given through the capability of each transmitting channel to start transmission over the common transmitting channel. When transmission by one transmitter is in progress, transmission by another transmitter must be avoided. This can be ensured in ways known in the art in that a transmission process in progress is signalled to all transmitters by which each one is prevented to start a transmission process. The difficulty of this prior art is in the recognition of the simultaneous start of two transmitting processes and the corresponding prevention. For this purpose, in circuit arrangements of the known prior art, the binary character being on the transmitting channel in the process of being transmitted is transferred backwards and supplied back to the transmitters of which each transmitter transmitting at the time compares this binary character received back instananeously with the instantaneous binary character actually brought by itself to the point of being transmitted—which means only by it—. As soon as a transmitter recognizes hereby a difference between the instantaneous binary character transmitted by itself and the instantaneous binary character coming to transmission over the transmitting channel, it interrupts, even while in progress binary character transmission. Up to this point, no binary character falsification can have taken place on the transmitting channel.

In order to prevent in a circuit arrangement of the known prior art a binary character falsification with certainty, it is required that the interruption mentioned before of the transmitting process of that transmitter which has recognized the binary character difference takes place in time, so that the start of a binary character falsification for the next binary character is prevented with some certainty.

This timeliness of the interruption of one of two accidentally simultaneously started transmission processes is a problem, the solution of which is fundamental to the invention.

In the case of a circuit arrangement of the known prior art no preparatory selection before the occupation of the transmitting channel through one of the several transmitters of one of possibly two or several transmissions, which at the same time are ready to start transmission, takes place. Such a selection is at the beginning of each transmitting process.

To prevent the start of the transmission process of a transmitter before another transmission process of another transmitter has commenced to transmit, is—as already mentioned still relatively easy to do and known in the prior art. However, to avoid having a simultaneous transmitter start with respect to the common pulse clock control turn into a falsification of information transmitted over the common transmitting channel, the known measure is to have each transmitter begin a new transmitting process always with the transmission of its binary coded transmission specific address. Independently of that, it can additionally be provided that a transmitter checks before transmission begins if a transmission process of another transmitter is in progress; however, with such a check the case of an accidental simultaneous transmission start does not register. Through transmission of its own binary coded address of each transmitter at the beginning of the transmission of the actual message, it becomes possible to prevent a pulse timed accidental simulataneous start of the transmission of two transmitters and, thus, preclude information falsification. For the prevention of information falsification, the previously indicated passing of one character of one kind of two binary characters is compared to a pulse timed synchronous character of the other kind as well to the comparison done per transmitter and per character of the character transmitted by that particular transmitter with the actual instantaneous character present on the transmitting channel. If two transmitters have started pulse timed synchronous transmission, then there always appears in the first transmission of the transmitter a specific binary coded address, with certainty at least in one bit of the several synchronous transmitted binary characters. These addresses by necessity have a character inequality with respect to the binary character transmitted by it and the binary character state existing instantaneously on the transmitting channel. This character inequality is only recognized through the comparison of that transmitter (and only through that, not through the other transmitter) which with this particular bit transmits the character of the mentioned other kind; thus, the character compared to the character of the mentioned one kind is inferior, that is, the binary character which does not assert itself. The transmitter recognizing the character inequality immediately interrupts its transmission process while the other transmitter continues its transmission process without having even noticed these transient transmission paralleleties and without a character falsification in the binary character transmitted. However, this interruption of the transmission process on the part of the particular transmitter must have taken place even before the start of the subsequent binary character so that this is not affected by a character falsification during one of the subsequent pulse measurements. This is the problem of timeliness.

The principle of the undirectional character as explained, presupposes a use of appropriate gate circuits with OR conditions. In known circuit arrangements of the kind of which the most significant characteristics were indicated, OR gates are used as for instance in the Nachrichtentechnische Zeitschrift 1957, 6, page 251, picture 9 and in the technical book "Das TTL Kpchbuch" published by Texas Instruments, Germany GmbH, applications labor, 805 Friesing edition TM 650/1172, 1st edition (Nov. 1972) pages 116, 306 and 317 ("Open Collector"). At the output side they transmit one of the two possible binary characters relatively low ohmicly, that is, not over a series resistance or over a line with a relatively low resistance value. The other of the two possible binary characters, however, are transmitted over a resistance, the value of which has to be large enough in view of a transmission of the first mentioned possible binary character. This means, however, for a transmission of the mentioned other binary character that it is transmitted over this resistance while the first mentioned binary character in comparison is transmitted relatively low ohmicly. This has, as a consequence, a capacitive line influences of the transmitting channel as well as unidirectional delays in the character transfer in signal paths leading to it and thus of distortions and therefore the danger of the character falsification whereby the binary character of the one kind and characters of the other kind are affected differently by these delays which increases the falsification effect.

With an arrangement of the known prior art further technical problems result if as has been considered above, two or more transmission processes accidentally start in equal time-slots. If a binary character of the one kind and another binary character of the other kind flow together on the transmission channel whereby the one single character first transmitted should assert itself against the several latter, transmitted characters then binary characters of the other kind with respect to its amplitude and/or pulse shape cause a character falsification leading to a transmission error.

If gate circuits of the known kind in the known manner are used, problems of transmission certainty with respect to the accuracy of the transmitted binary characters will result. At the same time, however, the problem of timeliness will result in a possible interruption of a transmission process because of the demand that two binary characters transmitted simultaneous and merged need to traverse the path from the particular two transmitters to the transmitting channel quickly enough, and back to the transmitters so that in one of them the transmission process is interrupted such that no character falsification occurs.

The present invention is designed to create an improved circuit arrangement over that of the prior art with more favorable conditions for the character transmission with respect to the transmission rate and the prevention of character falsification and to ensure thereby a timely interruption of a transmission process when such an interruption is necessary.

SUMMARY OF THE INVENTION

The present invention provides between the transmitters and the transmitting channel pulse clock controlled converters which function to renew the binary characters at their merger on the transmitting channel. A test channel for the transmitting channel is provided in which the transmitters circumvent the converter, and transmit their binary characters. The binary characters on their way to the test channel flow together and are transmitted between two clock pulses. An interruption of the transmission process, when required, can be carried out with certainty within the time interval between these two clock pulses.

The present invention creates through the addition of a test channel, in addition to the transmitting channel, for the interruption of a transmission when necessary, a temporal advantage compared to the known process of providing a binary character a difference to another binary character which is being transmitted simultaneously with the signal for the interruption. The converters required for the transmission processes are in the path from the transmitter to the transmitting channel. The path from the transmitteers to the test channel OR circuits can be used since in comparison to the transmitting channel, have relatively low output power and have correspondingly short operating times. The division of functions for transmitting and for supervising the transmitter parallelity permits functionally different circuit design for the paths to the transmitting channels and for the test channel.

The present invention permits the use in the test channel of simple OR circuits allow binary characters of kind assert themselves against binary characters of the other kind electrically and as characters in the indicated manner when binary characters of both kinds meet. According to the invention, such OR circuits can be used in the transmitting channel, which makes it possible to transmit alternatively each of the two possible binary signals that is, at each point in time either the one or the other of these binary signals—relatively low ohmicly and which precludes from the outset a co-mingling of the different binary signals. In connection with the invention it is possible also to provide that on the transmitting channel no binary characters of different kind can flow together. With this the transmission conditions can be improved significantly and the character passage of a binary character of the one kind compared to one or several binary character of the other kind which in known circuit arranement, used also in the transmitting channel and described above, is from the outset not endangered and the danger of character passage on the transmission channel has been eliminated.

The danger of a characteer falsification is, from the very outset, precluded.

In accordance with a further aspect of the invention, a specific delay of the transmission by at least one amount, presents an overload endangering of the transmitter with pulse timed simultaneous starts of the two transmission processes and with the appearance of character difference, with the interruption of the transmission to the transmitting channel which preceeds the transmission of the unequal characters.

The delay of the transmission by at least one predetermined amount ensures the possibility that the required time is available for the necessary interruption of the transmission process to the transmitting channel. It is, thus, on the basis of the principle of the character transmission on the test channel which, according to the invention is eliminated on the transmitting channel. That delays the gain of the comparison result which is responsible for the timely interruption of the transmission of the binary characters to the transmitting channel, nevertheless through the invention it is ensured that such a required interruption takes place in such a timely fashion that a meeting of binary characters of unequal kind on the transmitting channel is prevented with certainty.

BRIEF DESCRIPTION OF THE DRAWING

The simple figure shows an embodiment of the invention only in those component parts which are required for its understanding.

DESCRIPTION OF THE PREFERRED EMBODIMENT

A plurality of n Transmitters K1 to Kn are provided which in a manner known and therefore not further described, and to which reference may be made to German Patent No. 3 11 10/22, are synchronous pulse clock controlled transmitters. They are equipped for the transmission of binary coded information. They have simultaneous access to a common transmitting channel C. However, provisions are made that a transmission of binary coded information over the transmitting channel takes place simultaneously from only one single transmitter. The facility shown in the drawing is part of a digital concentrator ("Digital Line Unit DLU"). The transmitting channel C is a central character channel common to several channels over which all information serving to establish connection, to maintain connection and to dissolve connection are transmitted. In the journal "telcom report", No. 4 of 1982 (English edition) the principle generally of a digital concentrator are shown and described. It can have several concentration steps. It is evident from the illustration, that devices A1 to Am belong to a first concentration step while device B is part of a second concentration.

Such devices are described in the journal "telecom report", No. 4 (1982), page 262 (pp) of the English edition. The devices A1 to Am can be multiple subscriber line circuits (SLM) with one module processor (SLMCP) while the device B represents a concentrator processor (DICC+DIC), such as described in detail in German Pat. No. 35 12 846. More than two concentration steps may be used. The concentration includes gate circuits which fulfil the logic OR condition. These are OR circuits which are able to transmit each of the two possible binary signals relatively low ohmicly.

Transmitters K1 to Kn are in addition to the common transmitter channel C connected with a common test channel Z. They lead their binary coded information simultaneously to the common transmitting channel C and to the common test channel Z over the concentration circuits X1 to Xm and Y which with respect to their outer connections correspond to the concentration steps A1–Am and B. The transmitters always receive back the information transmitted on and over the test channel and carry out with one comparator per transmitter, for example K1, a comparison through which it compares the total information transmitted to the transmitting channel instantaneously with the information transmitted by the particular transmitter with respect to equality of characters, respectively inequality of characters, bit-by-bit. This comparison takes place corresponding to the clock controlled progress of the transmission process, which means, singly per binary character of the information; that is, each binary signal transmitted to the transmitting channel C for transmission (over L1/P1/A . . . , B) is compared with the binary signal corresponding to it which the particular transmitter receives back over the test channel Z and the signal path e.

In the event, that one of the transmitters, for example transmitter K1 is ready to start transmitting and that a transmission process by another transmitter, for example transmitter Kn is already in progress, the particular transmitter is able, for example K1, to recognize this fact on the basis of the information received back over the test channel Z. It is, however, more difficult to recognize and prevent the pulse-timed simultaneous start of two transmission processes of two transmitters. To recognize such a simultaneous start of two transmission processes by two different transmitters in order to interrupt one of these two transmission, the present invention provides that each transmitter transmits initially always at the beginning of a transmission process as information its own binary coded address to the common transmitting channel. Since it is further provided that each transmitter transmits the information transmitted by it for transmission over the transmitting channel C also to the test channel Z, in case of a simultaneous transmission, however, started independent of each of two informations, their binary signals flow together on the test channel Z and especially in the concentration circuit Y or in one of the concentration steps X1 to XM.

With binary coded information transmission, each binary character of a binary coded information can have one of two states. Each binary character can, thus, be a character of a first kind or a character of a second kind. In the concentration steps X1 to Xm corresponding to the concentration steps A1 to Am there are logic OR circuits of the kind described in the mentioned illustration 9 of the Nachrichtentechnische Zeitschrift or similar ones whereby it is essential that in a same measure meeting of binary characters of different kind the binary character of the first kind always dominates. Using these logic OR circuits thus creates the possibility that in the event of simultaneous transmission of two information signals however, started independently of each other by two different transmitters, in case of inequality between two simultaneously transmitted bits, the character of the one kind of the two possible kinds of binary characters compared to the character of the other kind always asserts itself electronically.

For the prevention of the simultaneous start of two information transmission processes by two different transmitters, for example K1 and Kn, each of them transmits always at the beginning of a transmission process as information its own binary coded address. The transmitters K1 to Kn each have binary coded addresses which are different from one another and are individually assigned to each respective transmitter. If two accidentally simultaneous starting transmitters transmit their binary coded addresses, they are, among others, transmitted over the test channel Z back to them again. Both binary coded addresses meet at the latest on the test channel Z. That means, they flow together, bit-by-bit, which is, binary character by binary character from each of the two transmitters. What flows in the final analysis back to the transmitters is a mixture of both address information in the manner of the already stated rules that in the case of simultaneous transmission—however, started independently of each other—of two address informations by two different transmitters by inequality between two simultaneously transmitted bits the binary character of the one (first) kind of the two possible kinds of binary characters always asserts itself against the binary character of the other (second) kind.

Each address information consists in the known manner of several binary characters transmitted in succession by the particular transmitter. As long as the binary characters of two address informations, transmitter specific and clock synchronous are transmitted simultaneously and are equal, the simultaneity of two transmitting processes cannot be recognized by any of the involved transmitters. By the same token, the address information transmitted over the common transmitting channel C cannot be falsified either. As soon, however, as in one of the bits of the binary coded address information being transmitted successively to each other a character inequality appears, one of the two transmitters recognizes this immediately through its comparator.

It may be assumed that at a given point in time the transmitter Kn transmits the binary character of the first kind, transmitter K1 at the same moment a binary character of the other kind. In this operating situation, this binary character of the first kind transmitted by transmitter Kn arrives over the test channel Z back at all transmitters, which means, also back at transmitter K1. The latter, however, at this very moment transmits the binary character of the other kind. Its comparator V, thus, registers character inequality between the binary character transmitted by itself at this time, and by the binary character received back over the test channel Z. On the basis of this recognition of the character inequality, transmitter K1 has cause through its conventional logic circuits which are part of the comparator (not shown in detail, but for example, the comparator inputs $v^1$ $v^2$ may be connected with the two inputs of a coincidence gate also clock controlled and its output with the comparator output $v^3$, carrying out the comparison, to interrupt its transmission immediately).

By the previously described method of operation a character falsification with respect to the binary characters transmitted over the transmitting channel is prevented.

Transmitter K1 thus interrupts its transmission process because the character received under the operating conditions described is of the one kind, however, the character transmitted by it is of the other kind. The two transmitters thus supply the transmitting channel, and the test channel with the two address informations and receive back in return the binary character transmitted over the test channel and use them for the described comparison. In the event of inequalities, that transmitter which has recognized this inequality through its comparator, interrupts its transmission, that is, the transmission of the binary characters of the address information to the common transmitting channel as well as to the test channel Z immediately.

Between the transmitters K1 to Kn and the transmitting channel S are devices A1–Am and B in two concentration stages. These contain pulse clock controlled converters which serve the renewal of the binary characters at their joining to the transmitting channel. In addition to the transmitting channel, the test channel Z is provided to which the transmitters transmit their binary characters, additionally and by circumventing the converters. The binary characters flow together from transmitters which have been started accidentally simultaneously on their path to the test channel. Such binary characters, however, are transmitted between two clock pulses in such a way and joined on the test channel and from there transferred back to the transmitter that a recall of the transmission process which might become necessary with certainty still takes place within the time interval between these two clock pulses.

The principle of putting through binary characters of the one kind compared to pulse-timed simultaneous binary characters of the other kind—as has already been explained—is limited to the test channel whereas the transmission of the binary characters of the one kind and of the binary characters of the other kind takes place on the transmitting channel relatively low ohmicly.

In order to prevent with certainty a character falsification of the information to be transmitted, with respect to the binary character which actually is in the process of being transmitted on the transmitting channel C it is necessary that in the event of transmissions which are simultaneous, however, started independently of each other, of two address informations by two different transmitters with inequality between two binary characters transmitted simultaneously by the particular transmitters, the transmission process of that transmitter which happens to be transmitting the binary character of the start of the next time clock. This means, before the binary character which is to be transmitted next. Transition time problems can arise because the transmission of a binary character transmitted by one of the transmitters, for example K1, over the concentration step X1 and Y as well as over the common test channel Z and over the signal paths d and e, time is used in the transmission. This time requirement has a relationship to the given clock frequency, that is, in the final analysis, a relationship to the duration of each binary character transmitted by a transmitter. This time requirement is caused—as has been explained previously—by the use of gate circuits, known through the mentioned NTZ literature cited, which allows the character passage of a binary character of the one kind compared to the binary character of the other kind, in the concentration steps X1 to Xm and dY of the test channel Z. In the case of the described simultaneous transmissions however, started independently of each other, of two address informations by two different transmitters, in the event of inequalities between the two binary characters transmitted, and transmitted by them simultaneously, this inequality has to be recognized by the particular transmitter, for example K1, with the particular comparator V, as well as the transmission of further binary characters, i.e. of the immediately following binary character to the common transmitting channel C, also has to be interrupted. This takes place with a blocking device P1 which is assigned to the transmitter K1. A blocking device is assigned to each one of the transmitters.

The principle of transmission of binary characters of the one kind compared to simultaneously transmitted binary characters of the other kind applied to the test channel is especially simple and therefore advantageously realized with well known logic OR circuits, such as shwon in the before-mentioned illustration 9 of the Nachrichtentechnischen Zeitschrift. To this principle, however, the already mentioned transition time connections are causally realized. It is provided that the principle of transmission of a binary character of the one kind compared to the simultaneous binary character of the other kind is limited to the test channel including the guide paths of the network assigned to it which lead through the concentration steps X1 to Xm and Y. In contrast, in the concentration steps A1 to Am and B through which the actual transmission of the binary characters of the information to be transmitted by the transmitters takes place, other logic OR circuits are used and, in particular, of a kind over which binary characters of the one kind as well as binary characters of the other kind are transferred relatively low ohmicly to the transmitter channel C and presented for transmission. The further transfer of these binary characters of both kinds by a transmitter over the concentration steps A1 to Am and B as well as the transmission of these binary characters over the common transmitting channel C, for that reason, takes place with relatively little delay and distortion. For that reason, a relatively high transmission quality is achieved. By comparison, the transmission of the same binary characters over the concentration steps X1 to Xm and Y and over the test channel Z experiences a slight delay because of the application here of the described principle of passing.

For the elimination of time problems possible under these conditions with respect to the timely interruption of an address information transmission process on the path of a transmitter, each transmitter, for example to K1, can be assigned a delay device, for example L1, with which the transmission of binary characters over the common transmission channel C can be delayed. It is, however, also possible to provide one common delay element for several or all transmitters. These delays might be by at least one predetermined amount for all delay devices of the different transmitters. Through these delays of the transmission of address information binary characters by at least one clock, an overload with simultaneous start of two transmission processes and with the appearance of character inequaltiy in the manner described before in detail, which would endanger the transmitter can be avoided together with bit falsification, whereby it is required that one of the two transmitters is stopped in time. The particular transmitter is prevented from being overloaded when the binary characters transmitted by it carry unequal values. The transmission of such unequal binary characters is, thus, preceeded by the interruption of the transmission of the binary characters to the transmitting channel on the part of one of the two transmitters by which such overloading is prevented. The problem of overloading can affect the transmitter and/or the blocking devices assigned to them, for example P1, thus the outputs of those transmitter specific devices from the binary characters are transferred to the concentration steps A1 to Am.

What is claimed is:

1. A switching circuit for PCM long distance exchange facilities, in which a plurality of synchronous pulse clock controlled transmitters transmitting binary coded information have simultaneous access to a common transmitting channel and in which provision is made for the interruption of two or more simultaneous transmissions after simultaneous transmission by two or more transmitters, each of said transmitters including:
   (a) means for initially at the beginning of a transmission always transmitting its own binary coded transmitter specific address;
   (b) means for providing that the information transmitted by the transmitter flows together bit-wise when transmitted by two or more transmitters simultaneously;
   (c) means for providing that when inequality of binary characters transmitted by two or more transmitters in coequal time-slots and flowing together the character of one type of two possible types of binary characters asserts itself against the character of the other type;
   (d) such that the information flowing together is transferred back to the transmitters;
   (e) including means for each transmitter to compare bit-by-bit the information instantaneously transmitted with the information received back at the corresponding point in time;
   (f) means for providing that each transmitter in the event that the character received back at said corresponding point in time is a character of one type, and the character transmitted with coequal time-slots is one of the other type the transmission is interrupted, comprising;
   pulse clock controlled converters between the transmitters and the transmission channel for renewing the binary characters at the transmitting channel; and
   a test channel over which the transmitters transmit their binary characters; whereby the binary characters on their way to the test channel flow together, are transmitted between two clock pulses and are combined at the test channel and coupled back to the transmitter such that a potentially required interruption of transmission with certainty occurs within the time interval between two clock pulses.

2. A switching circuit according to claim 1, wherein the transferring a binary character of the one type compared to a pulse-timed simultaneous binary character of the other type is limited to the test channel while the transmission of the binary characters of the one type as well as the binary characters of the other type to the transmission channel is transmitted relatively low ohmicly.

3. A switching circuit according to claim 1, wherein a transmitter specific delay of its transmission by at least one clock pulse, and a pulse-timed simultaneous start of two address transmission processes in the event of character inequality, an overload endangering the transmitter and a bit falsification are prevented by said transmitter specific interruption of the transmission to the transmitting channel preceeding the transmission of such unequal characters.

4. A circuit according to claim 1, further including a comparator comprised of a clock controlled AND circuit.

5. A circuit according to claim 1, wherein the binary signals are transmitted by each transmitter to a common signal channel.

* * * * *